May 8, 1956 V. A. JOHNSON 2,744,293
LINT AND FIBER CLEANER
Filed Dec. 2, 1950 4 Sheets-Sheet 3
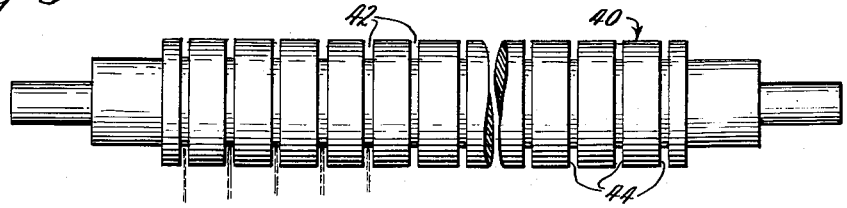
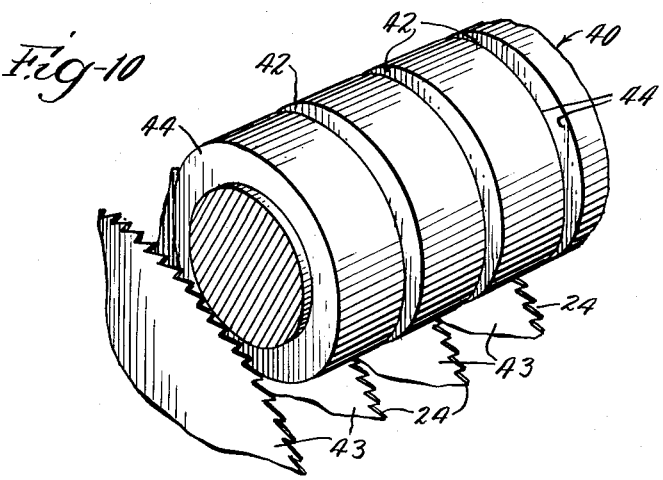
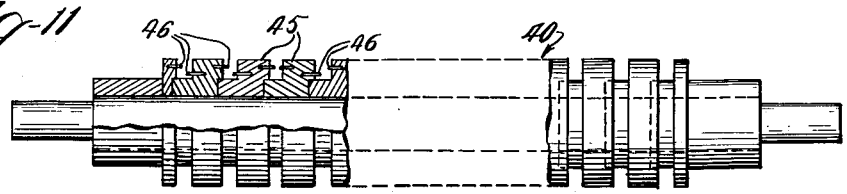
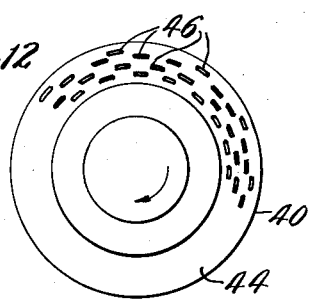
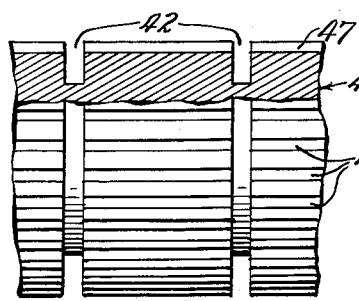
INVENTOR.
Vivion A. Johnson May 8, 1956 V. A. JOHNSON 2,744,293
LINT AND FIBER CLEANER
Filed Dec. 2, 1950 4 Sheets-Sheet 4
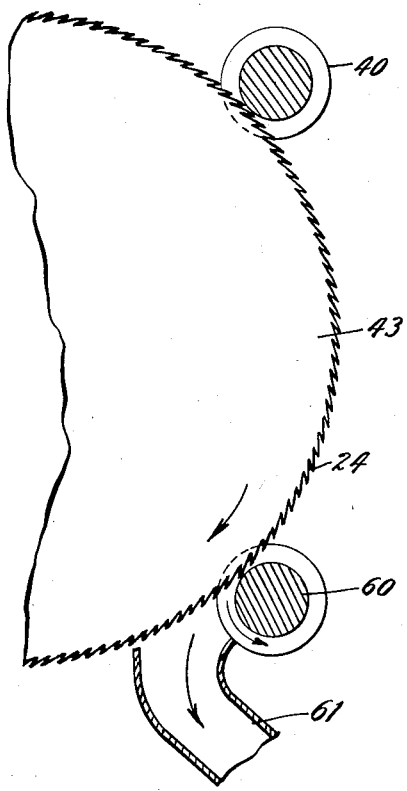
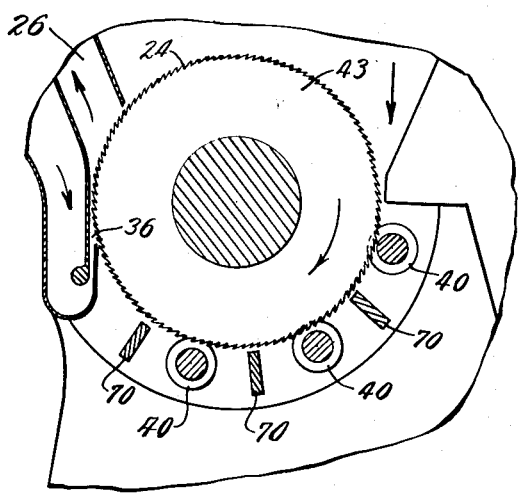
INVENTOR.
Vivion A. Johnson
BY
Mann, Brown and Hansmann
Attys.

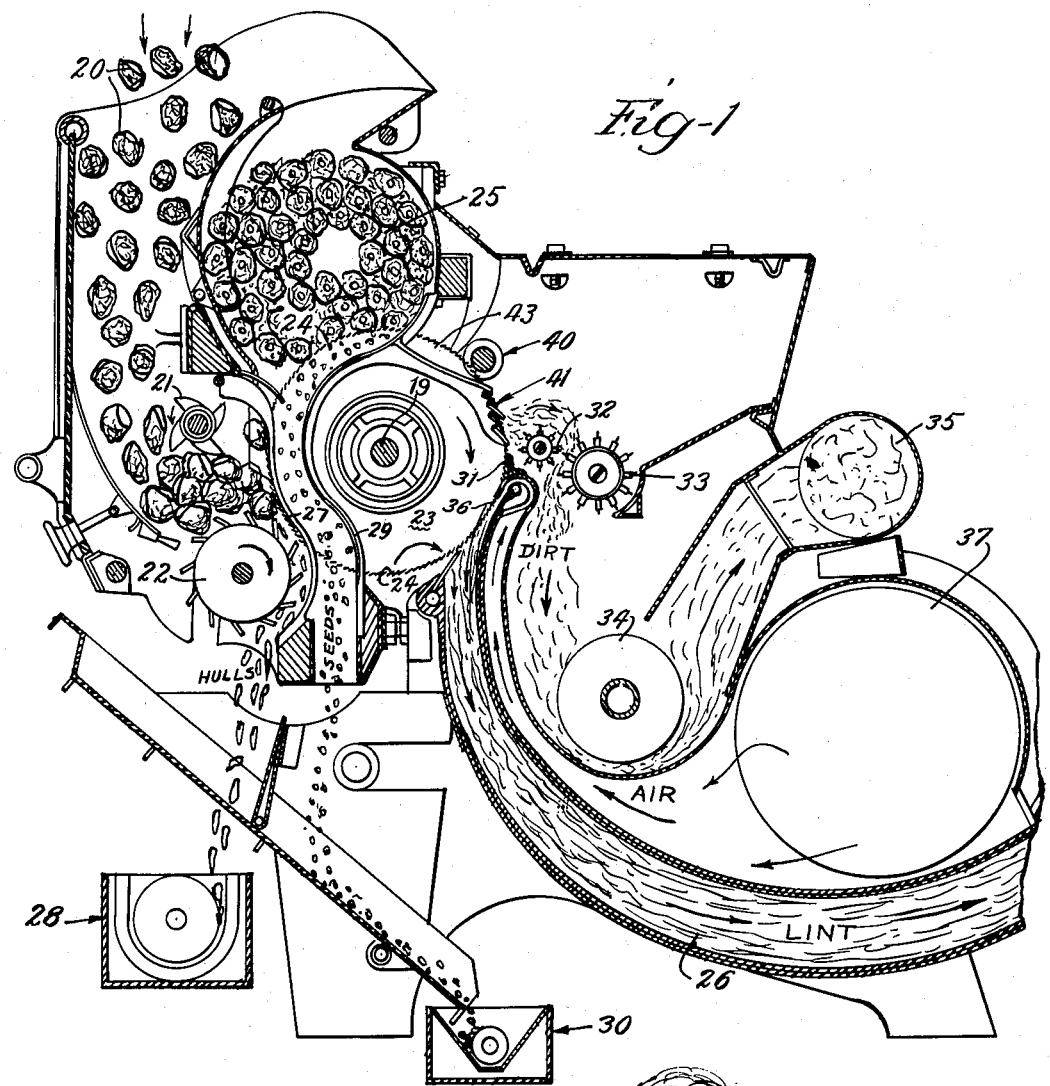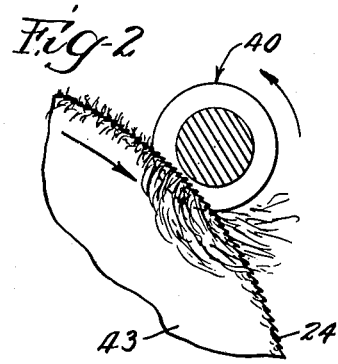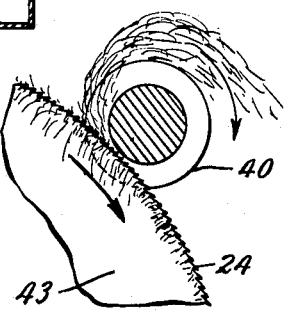

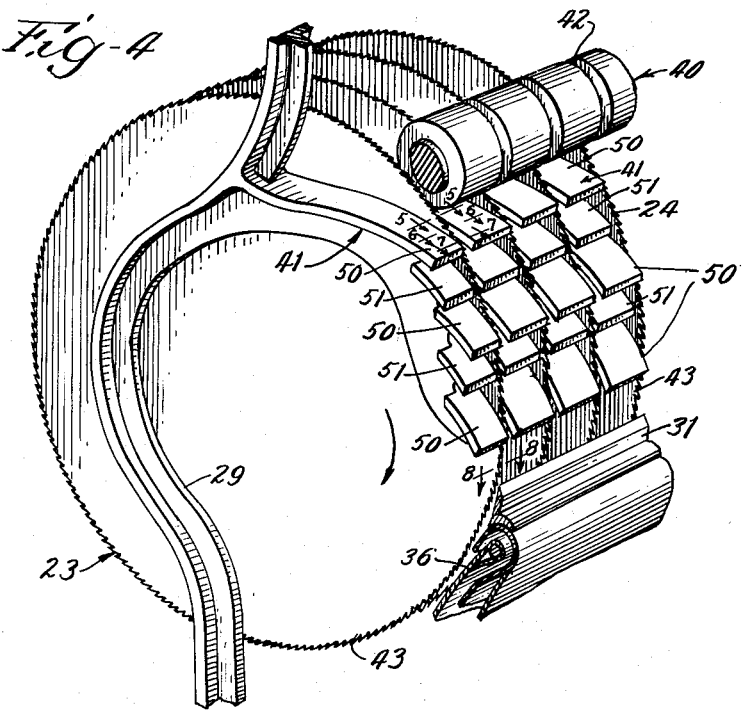
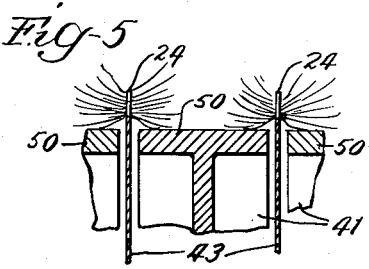
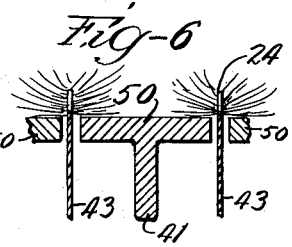
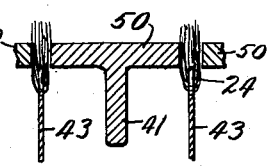
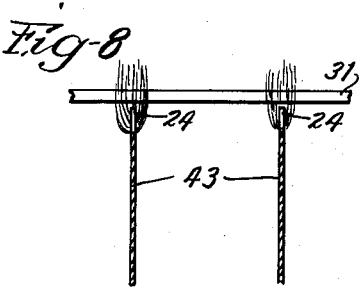
INVENTOR.
Vivion A. Johnson
BY
Mann, Brown and Hausmann
Attys.

United States Patent Office 2,744,293
Patented May 8, 1956

2,744,293

LINT AND FIBER CLEANER

Vivion A. Johnson, Indianola, Miss.

Application December 2, 1950, Serial No. 198,885

5 Claims. (Cl. 19—59)

This invention relates to apparatus for cleaning fiber, particularly when the fiber is being carried on the teeth of a circular saw or some other movable support having saw teeth. The invention is particularly applicable to cotton gin stands and, for convenience of disclosure, will be described as applied to a cotton gin stand.

It is well recognized that the price whcih lint will bring on the open market is dependent in large measure upon its whiteness, which in turn is dependent upon the extent to which it has been cleaned, and it is therefore an object of the present invention to provide a simple yet effective device for attachment to conventional gin stands which will substantially increase the quality of the lint coming from the stand by making it whiter and freer from foreign substances.

The invention is applicable wherever fibers are being moved along a given path while supported by saw teeth, and while the gin stand is a convenient place to incorporate the teachings of this invention, it should be understood that the invention may be used in lint cleaners and any other raw textile equipment and apparatus.

Further and other objects and advantages will become apparent as the disclosure proceeds and the description is read in conjunction with the accompanying drawings, in which Figure 1 is a somewhat diagrammatic sectional view of a cotton gin stand embodying the teachings of this invention;

Figure 2 illustrates the coaction between the cleaning roller and the lint-carrying saw when the roller is rotated in one direction;

Figure 3 corresponds to Figure 2 but shows the coaction between the cleaning roller and the saw when the roller is rotated in the opposite direction;

Figure 4 is a diagrammatic perspective view showing a cleaning roller, a series of deflecting ribs and a knife blade, all arranged in accordance with the teachings of this invention for coaction with a saw cylinder for cleaning the fiber carried thereon;

Figures 5, 6 and 7 illustrate how the deflecting ribs lift the lint or other fiber from the sides of the saw, so that it may be effectively cleaned by impact with subsequent deflectors or knife blades the sections being taken on the lines 5—5, 6—6 and 7—7, respectively, of Figure 4;

Figure 8 illustrates how the knife blade is made more effective by the action of the deflector ribs;

Figure 9 is an elevational view showing the cleaning roller;

Figure 10 is a fragmentary perspective view showing the coaction of the cleaning roller with the saw cylinder;

Figure 11 shows a cleaning cylinder made up from a number of interfitting parts with carding needles carried on the interior surfaces which receive the saw blades;

Figure 12 is an end elevational view of one of the elements that makes up the composite cleaning roller of Figure 11;

Figure 13 is a fragmentary view partly in elevation and partly in section, showing how the exterior surfaces of the roller may be fluted in order to provide more effective cleaning action;

Figure 14 illustrates the manner in which a cleaning roller made in accordance with this invention may also be used for a doffing roller; and Figure 15 shows the application of this invention to a lint cleaner as distinguished from a gin stand.

The invention may be variously embodied within the scope of the appended claims, and the specific description that follows is merely for the purpose of complying with 35 U. S. Code, Section 112.

General organization

Referring to Figure 1, a gin stand is shown which is of conventional construction, except for the inclusion of the cleaning apparatus of this invention. The stand receives raw cotton, indicated at 20, from an extractor feeder or some primary cleaning device, and the cotton is fed by upper and lower picker rollers 21 and 22 to the saw cylinder, indicated generally at 23. The saw cylinder comprises a number of spaced circular saws (see Figure 4) driven through a common rotatable shaft 19 (Fig. 1) having forwardly facing marginal teeth 24 which catch the cotton and carry it to the roll box 25 and eventually to the lint flue 26 where the lint is carried to other cleaning apparatus or to a baling device.

When the cotton is first picked up by the saw cylinder 23 by the action of the upper and lower picker rollers feeding it to the saw cylinder, the hulls and other large pieces of debris are removed from the cotton by hulling ribs 27 which are interposed between the component saw blades of the saw cylinder 23 and provide sufficient clearance for the lint and seeds to pass through the ribs 27.

The hulls removed from the cotton by the ribs 27 drop to a trash conveyor, generally indicated at 28, aided by the action of the lower picker roller 22.

After the seed-carrying lint has been picked up by the saw cylinder 23 and has passed through the hulling ribs 27, it then strikes the ginning ribs 29 which are likewise disposed between the component saws of the saw cylinder 23 but provide more limited clearance with the saws so that no seed can pass beyond the ginning ribs. As a result, some of the lint with its seeds is doffed from the saw cylinder and enters the roll box 25 where the lint is again picked up by the saw cylinder 23 and finally carried past the ginning rib 29 minus the seeds. The seeds which are stripped from the lint pass between the saws and fall to a seed conveyor, generally designated 30.

Conventionally a knife blade positioned close to the periphery of the saw cylinder, as indicated at 31, tends to deflect foreign material carried by the lint on the saws through oppositely rotating moting or vacuum wheels 32 and 33 where the dirt that has been removed is moved by a conveyor 34 lengthwise of the gin stand and is finally removed from the stand through a suction flue 35.

The lint on the saw cylinder 23 is usually doffed therefrom by an air blast coming from nozzles 36 which are directed to lift the lint from the saw teeth 24 and doff it into the lint flue 26. The nozzles 36 receive air under pressure from a flue or reservoir, generally indicated at 37, and suitable pressure differentials are provided to move the lint through the flue 26.

The present invention is conveniently applied to a gin stand, such as hereinabove described, between the ginning ribs 29 and the air nozzles 36, because within this space on the saw cylinders, the lint is already on the circular saws free of seeds but carrying other foreign material that should be removed from the lint in order to give it high quality.

The cleaning devices

The cleaning devices of this invention comprise a cleaning roller, generally designated 40, deflecting ribs, generally designated 41, and the knife blade 31, which, although previously used in gin stands by itself, has substantially greater effectiveness because of the action of the cleaning roller 40 and deflecting ribs 41 upon the lint carried by the saws.

The cleaning roller

The roller 40 is coextensive with the saw cylinder and is grooved, as indicated at 42, to receive the individual saws 43. The roller 40 preferably has an outside diameter of $1\tfrac{15}{16}$ inches and the grooves 42 are preferably $\tfrac{1}{8}$ of an inch wide and $1\tfrac{1}{32}$ of an inch deep. These dimensions may, of course, vary according to the thickness of the saw blades 43 and their diameters, but the above dimensions have been found appropriate for conventional gin stands.

The cleaning roller 40 is mounted in any suitable manner for independent rotation, and when the rotation is opposite to that of the saw cylinder 23, the foreign material which is separated from the lint on the saw blades by impact with the cleaning roller 40 is deflected between the saw blades, as shown in Figure 2; whereas when the cleaning roller is rotated in the same direction as the saw cylinder, the foreign material is deflected away from the saws, as indicated in Figure 3.

To assist in this cleaning action, the side faces 44 of the grooves 42 may be roughened, or when the roller 40 is made up of composite sections, such as indicated at 45 in Figure 11, the faces 44 of the grooves may be provided with carding needles 46, which are bent rearwardly (with relation to the direction of rotation), as shown in Figure 12, to comb the lint or other fiber on the saw blades without doffing it. Also, the exterior surface of the roller 40 may be longitudinally fluted, as indicated at 47 in Figure 13, so that the roller in contacting the lint carried by the saw blades 43 will more effectively remove the foreign material from the lint by impact and deflection.

In some practices of the invention, it may be desirable to have the roller 40 made of a plastic material, such as Lucite (a methyl methacrylate resin), Bakelite (a phenol formaldehyde, a urea formaldehyde resin), or some other material capable of building up a static charge when contacting the lint or other fiber on the saws to thereby repel the fly-lint and trash.

The speed of rotation of the cleaning roller 40 will depend upon conditions, but I have found that if the saws are rotated at a speed of 700 R. P. M. the cleaning roller 40 may be rotated at about 50 R. P. M. and produce satisfactory results. If the cleaning roller is rotated in the same direction as the circular saws, as shown in Figure 3, it may be desirable to have the cleaning roller rotate at a somewhat higher speed in order to increase the tendency of the roller to move the dirt particles away from the saws, but the speed should not be great enough to doff the lint from the saws.

The deflecting ribs

Either before or after the lint on the saws is subjected to the action of the cleaning roller 40 (but preferably after), the lint may be subjected to the action of deflector ribs, generally designated 41, which may be made a part of the gin ribs 29 or separately mounted in relation to the saw cylinder 23. The deflector ribs are best shown in Figures 4–7 inclusive, and reference will be made particularly to these figures in the description that follows.

The deflecting ribs 41, preferably each comprises a plurality of long blades 50 and short blades 51, the former projecting beyond the peripheral margin of the saws 43 and the latter stopping short of the peripheral margin. The function of the short blades 51 is to lift the lint carried by the saws 43 away from the sides of the saws and form it into a widened band without dislodging it from the saw teeth, and the function of the longer blades 50 is to contact the sides of the lint carried on the saws and to remove the foreign material from such portions of the lint by impact of the foreign material with the blades 50. After blades 50 have somewhat flattened the lint against the saw blades, the short blades 51 again produce the widened band of lint for coaction with the next long blades 50, with the result that the sides of the lint carried by the saws are effectively cleaned by the blades 50 and 51. The latter blades 51 obviously perform a cleaning action as well as the additional function of lifting the lint away from the sides of the saw blades.

The spacing between adjacent deflecting ribs along the length of the saw cylinder, and the width of the deflector blades in relation to the spacing between the saws comprising the saw cylinder 23 will vary according to circumstances, but normally a spacing of $\tfrac{1}{8}$ of an inch between the adjacent ribs will provide adequate clearance for the saws and the lint carried by the saws. If desired, the short blades 51 may be positioned somewhat closer to the saws 43 than are the long blades 50, since the short blades cannot doff the lint due to their restricted length.

Figures 5, 6 and 7 illustrate in a general way the manner in which the long blades 50 coact with the saw blades 43 to clean the lint carried thereon.

The transverse knife blade

The knife blade 31 may be made a part of or attached to the air nozzles 36, as shown in Figure 4. The knife blade when used in conjunction with the cleaning roller 40 and the deflecting ribs 41 completes the cleaning of the lint on the saw blades by contacting that portion of the lint which is not effectively cleaned by the roller 40 or deflecting ribs 41. By properly adjusting the roller 40 radially with reference to the saws 43, the bottom of the grooves 42 may be made to coact with the lint that is extending radially outwardly from the saw blades, but additionally it is desirable to provide the knife blade 31 for further coaction with this portion of the lint or other fiber, as shown in Figure 8.

The doffing cylinder (Fig. 14)

Instead of using the air jets provided by the nozzles 36 for doffing the lint from the saw cylinder 23, a doffing cylinder 60 may be used which is similar in all respects to the cylinder 40 but which is made to travel in the opposite direction from that of the saw cylinder 23 and at a speed sufficient to doff the lint from the cylinder. This will be accomplished when the peripheral speed of the cylinder 60 substantially exceeds that of the saw cylinder 23, and, if it is desired, the doffing action may be assisted by an air jet or other pneumatic means, preferably such as is applied in the flue 61 to assist in the doffing action and the removal of the lint from the saw cylinder.

Application to lint cleaners

After cotton has passed through a gin stand, it is often sent to a lint cleaner where the lint is again put on circular saws for coaction with a plurality of bar deflectors 70, such as shown in Figure 15. These bar deflectors 70 can only coact with that portion of the lint which extends outwardly from the saw teeth, and in order to clean that portion of the lint that lies radially inwardly from the outer periphery of the saw teeth, I advantageously mount cleaning rollers 40, such as heretofore described, between the deflector bars 70, and thereby produce a much more effective cleaning action. Obviously, deflector blades such as 50 and 51 could be used, if desired.

Various modifications of the above-described invention will occur to those skilled in the art, and it is intended that these obvious modifications should be included within the scope of the appended claims.

I claim:

1. In apparatus for removing foreign material from cotton or other fiber, the combination of a relatively thin movable support having marginal teeth, means for moving said support to cause fiber to adhere to said teeth, and deflector means having portions thereof in close proximity to at least one side of said movable support adjacent said teeth, whereby foreign material is separated from the fiber by impact with said portions, said deflector means including a grooved roller, a deflecting rib and a knife blade each adapted to contact a portion of the fiber being carried by said teeth to thereby separate the foreign material from said fiber by impact.

2. In apparatus for removing foreign material from cotton or other fiber, the combination of a relatively thin movable support having marginal teeth, means for moving said support to cause fiber to adhere to said teeth, and deflector means having portions thereof in close proximity to at least one side of said movable support adjacent said teeth, whereby foreign material is separated from the fiber by impact with said portions, said deflector means including a roller having a peripheral groove adapted to receive the teeth of said movable support, the sides of said groove being provided with inwardly facing projections.

3. In apparatus for doffing fiber from the marginal teeth of a movable support, the combination of a roller having a U-shaped peripheral groove with substantially parallel sides adapted to receive the teeth of said support with the substantially parallel sides of the groove in close proximity to the sides of said support, whereby the fiber carried by the teeth makes contact with the sides of said groove, and means for rotating said roller in a direction such that the portion of the grooved roller that receives said teeth is moving in the same direction as said teeth but at a greater speed, whereby the fiber is effectively doffed from said teeth.

4. In apparatus for doffing fiber from the marginal teeth of a movable support, the combination of a roller having a U-shaped peripheral groove with substantially parallel sides adapted to receive the teeth of said support with the substantially parallel sides of the groove in close proximity to the sides of said support, whereby the fiber carried by the teeth makes contact with the sides of said groove, means for rotating said roller in a direction such that the portion of the grooved roller that receives said teeth is moving in the same direction as said teeth but at a greater speed, whereby the fiber is effectively doffed from said teeth, and pneumatic means for aiding said roller in doffing the fiber from the movable support.

5. In apparatus for improving the quality of cotton lint which has been separated from raw cotton by the action of a circular saw to the teeth of which the cotton lint adheres, the combination with said circular saw of a first deflector means positioned closely adjacent the side faces of the saw and extending outwardly to a point short of the tip of the teeth for laterally spreading the lint carried on the teeth without doffing therefrom, a second deflector means positioned in the path of said laterally extended fibers for dislodging by impact foreign material carried by said laterally extending fibers, and a third deflector means in the form of a stationary knife blade positioned closely adjacent to but spaced from the outer periphery of said teeth for dislodging foreign material from that portion of the lint or fibers carried by the teeth which extend beyond the outer periphery of the saw.

References Cited in the file of this patent

UNITED STATES PATENTS

| | | |
|---|---|---|
| Re. 23,044 | Brooks | Oct. 19, 1948 |
| 2,608 | James | May 7, 1842 |
| 10,106 | Gullett | Jan. 10, 1854 |
| 41,487 | Craven | Feb. 9, 1864 |
| 246,276 | Kinney | Aug. 23, 1881 |
| 342,333 | Cox | May 25, 1886 |
| 1,019,240 | Fordyce | Mar. 5, 1912 |
| 1,087,831 | Rozier | Feb. 17, 1914 |
| 1,375,986 | Vardell | Apr. 26, 1921 |
| 1,426,687 | Vardell | Aug. 22, 1922 |
| 1,725,268 | Hancock | Aug. 20, 1929 |
| 1,767,894 | Petty et al. | June 24, 1930 |
| 1,795,794 | Owen | Mar. 10, 1931 |
| 1,906,811 | Purcell | May 2, 1933 |
| 1,941,666 | Dickie et al. | Jan. 2, 1934 |
| 2,187,867 | Streun | Jan. 23, 1940 |
| 2,316,824 | Tobias et al. | Apr. 20, 1943 |
| 2,489,827 | Smith | Nov. 29, 1949 |
| 2,588,593 | Vandergriff | Mar. 11, 1952 |
| 2,634,460 | Morrow | Apr. 14, 1953 |
| 2,634,461 | Merkel | Apr. 14, 1953 |
| 2,658,239 | Day | Nov. 10, 1953 |